United States Patent
Wang

(10) Patent No.: US 7,924,707 B2
(45) Date of Patent: Apr. 12, 2011

(54) METHOD FOR REALIZING MANY TO MANY PROTECTION SWITCHING OF RING NETWORK

(75) Inventor: Guangjun Wang, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 587 days.

(21) Appl. No.: 11/568,579

(22) PCT Filed: Dec. 13, 2005

(86) PCT No.: PCT/CN2005/002166
§ 371 (c)(1),
(2), (4) Date: Nov. 2, 2006

(87) PCT Pub. No.: WO2006/063512
PCT Pub. Date: Jun. 22, 2006

(65) Prior Publication Data
US 2008/0107416 A1    May 8, 2008

(30) Foreign Application Priority Data
Dec. 13, 2004   (CN) .......................... 2004 1 0098487

(51) Int. Cl.
*H04L 12/26* (2006.01)
(52) U.S. Cl. ......... 370/222; 370/242; 370/406; 709/229
(58) Field of Classification Search .................. None
See application file for complete search history.

(56) References Cited

U.S. PATENT DOCUMENTS

| 6,144,633 | A | * | 11/2000 | Ikeda et al. ................... 370/217 |
| 7,145,882 | B2 | * | 12/2006 | Limaye et al. ................ 370/258 |
| 2002/0009091 | A1 | * | 1/2002 | Taniguchi ..................... 370/403 |
| 2003/0169470 | A1 | * | 9/2003 | Alagar et al. ................. 359/110 |
| 2004/0022279 | A1 | * | 2/2004 | Kailbach et al. .............. 370/542 |
| 2004/0179472 | A1 | | 9/2004 | Khalilzadeh et al. |
| 2004/0223503 | A1 | | 11/2004 | Lynch et al. |

FOREIGN PATENT DOCUMENTS
KR    2003-0066003    8/2003
* cited by examiner

*Primary Examiner* — Huy D Vu
*Assistant Examiner* — Zewdu Beyen
(74) *Attorney, Agent, or Firm* — Fish & Richardson P.C.

(57) ABSTRACT

A method for realizing many to many protection switching operation of ring network including: determining information of a switch request of M:N protection switching of the ring network, a destination node of the switch request, a source node of the switch request, a flag of long or short path, a status of bridging and switching, a channel number of protected working channel, and utilization condition of protection channels; carrying the information in a signaling and transferring it on the ring network; upon receipt of the signaling, performing the M:N protection switching of the ring network by a ring network node according to the information in the signaling. Therefore, the format of APS protocol signaling provided in this invention includes the information necessary for protection switching. This invention also provides an effective transmission approach of APS protocol signaling for protection switching.

11 Claims, 4 Drawing Sheets

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Switch Request | | | | Destination Node Number | | | | Source Node Number | | | | | | | Long or Short Path | Status of bridging and switching | | | Channel number of protected working channel | | | | | Utilization condition of protection channels | | | | | | | |
| | | | | | | | | | | | | | | | | | | | | | | | | A | B | C | D | E | F | G | H |

|   | 1 | 2 | 3 | 4 | 5 | 6 | 7 | 8 |
|---|---|---|---|---|---|---|---|---|
| 1 | Version number | | | | Channel number of protection channel initiating the request | | | |
| 2 | Msgid | | | | Serial number of PDU message | | | |
| 3 | Destination Node Number | | | | | Switching Status | | |
| 4 | Source Node Number | | | | | Flag of long or short path | Reserved | |
| 5 | Switch Request | | | | | Switch Page Verification | | |
| 6 | 1 | 2 | 3 | 4 | 5 | 6 | 7 | 8 |
| 7 | 9 | 10 | 11 | 12 | 13 | 14 | 15 | 16 |
| 8 | Channel number of protected working channel | | | | | | | |
| 9 | BIP8 check code | | | | | | | |

METHOD FOR REALIZING MANY TO MANY PROTECTION SWITCHING OF RING NETWORK

FIELD OF THE INVENTION

The present invention relates to the field of optical network communication, and more particularly, the present invention relates to a method for realizing many to many, i.e., M:N, protection of ring network.

BACKGROUND OF THE INVENTION

The protection switching is essentially a survivability technology. The survivability technology is a technology for improving the reliability of a network by providing an ability of service restoration from service interruption. This technology is supposed to be applied to all ring communication networks, to which protection switching is necessarily required.

The protection switching is widely applied in the communication networks. For example, SDH/SONET(Synchronous Digital Hierarchy/Synchronous Optical Network) provides the protections of 1+1, 1:N(one to many), two-fiber ring/four-fiber ring multiplex section protection, SNCP(Sub-network Connection Protection) and DNI(Dual-Node Interconnection) protection. OTN(Optical Transport Network) also have all types of above protection.

However, the protection switching in each of the above mentioned communication networks does not relate to the M:N protection mode which denotes a mechanism where M protection channels serve to protect N working channels. In a communication network, the anti-failure ability of a protection channel is typically same as that of a working channel, so their failure probabilities should also be the same. Thus, in the case that the 1:N protection is adopted and N is large, the probability of several working channels contesting for one protection channel may be high. In this case, the network can not provide protection for some of the working channels. Accordingly, it is necessary to promote the M:N protection, in which the relation between M and N is: 1<=M<=N, in communication networks.

For this reason, the US patent application US 2004/0022279 A1 presents a corresponding implementation method for M:N path protection, and the EP patent application EP1014613 A2 proposed a structure and function of network nodes for performing M:N protection switching. However, neither of the two patent applications provides a complete solution for M:N protection switching.

Wherein, US 2004/0022279 A1 describes an M:N path protection method. In the M:N path protection method provided by this patent application, use is made of the tandem connection monitoring function, the tandem connection reverse defect indication and the tandem connection trail trace identifier. Particularly, upon detection of a failure on the working channel segment, the occurrence of this failure is communicated to the far end node by inserting forced RDI (Remote Defect Indication) into the tandem connection as long as the failure persists. In the case of more than one protected paths, the failed path is identified by means of the unique trail trace identifier received on the protection channel. In the case of several protection channels, one network node is defined as slave node which has to follow the switchover initiated by the master node and choose the same protection channel as the master node. A combination of two timers is used to enable return from failure condition to normal operation.

Furthermore, the patent application EP1014613 A2 describes a structure and function of network nodes for performing M:N protection switching. A node of M:N ring network includes an optical switch array for the bridging(Dual-fed) and switching(selective-receipt) of optical signal. The optical switch array includes a number of separate optical switching networks, each of which corresponds to a protection channel and is connected to a protection optical port through an optical transceiver. Within the node, the protection channels can be changed respectively by changing the respective optical switch networks. A multiplexer and a de-multiplexer are also included, for the switching between the signals received from the optical ports and the signals processed by the optical switch array. A fault detector is used to detect the fault of signals after the signals are de-multiplexed. There are at least two nodes in a network. The two nodes are connected through two optical fibers for transmitting working traffic and protection traffic respectively. This patent application provides a method for routing protection traffic which is to enable at least two protection channels to provide protection for a number of working wavelength.

In consideration of this, an M:N protection switching technology of ring network is presented, wherein, the signaling interaction is performed by the transferring of switch protocol signaling on a protection channel or a private control channel through overhead bytes or special messages, thereby the protection switching of ring network is implemented. This technology provides support for external switching commands such as FS, MS, LP, etc., provides support for the configuration of the priority of a protection channel, and provides support for protection when the protection channel has a different bandwidth from that of the working channel. The protection channel has the functions of transmitting extra traffics and the like, can provide protection in the event of failure of several working channel, can optimize the long and short path protection channels to be used for protection of a working channel at the same time, thus providing a perfect protection switching. This technology provides a powerful method for realizing the M:N protection switching of ring network. However, this technology doesn't provide a specific definition of signaling and the transmission method thereof during the protection switching of ring network.

SUMMARY OF THE INVENTION

An embodiment of the present invention provides the following solutions:

A method for realizing many to many protection switching of ring network is provided, wherein the method includes:
  determining, by a ring network node, information of a switch request, a destination node of the switch request, a source node of the switch request a flag of long or short path, a status of bridging and switching, a channel number of protected working channel, and utilization condition of protection channels of M:N protection switching of the ring network;
  carrying the information in a signaling and transferring it on the ring network;
  upon receipt of the signaling, performing the M:N protection switching of the ring network by a ring network node according to the information in the signaling.

Particularly, the M:N protection switching operation is performed based on the channel number of the protected working channel and the information of utilization condition of the protection channels.

The signaling may be based on the Automatic Protection switching (APS) protocol signaling, and is carried and transmitted by overhead bytes or a Protocol Data Unit(PDU) message.

The information carried in the signaling may further include:

information of switch page verification, serial number, check code or protocol version number.

The information of the switch request may include:

at least one of information of span protection lockout request or signal failure protection request.

The utilization condition of protection channels may include at least one of whether a protection channel is in a status of partial pass-through, whether the protection channel is in an idle status, the protection channel being applied to span protection, the protection channel being applied to ring protection, or the priority of the corresponding switch request when the protection channel is applied.

The status of bridging and switching may include:

Alarm Indication Signal(AIS), Remote Defect Indication (RDI), that the protection channel being occupied by extra traffic, bridging and switching, bridging, and an idle status.

The process of determining by a ring network node information of a switch request, a destination node of the switch request, a source node of the switch request, a flag of long or short path, a status of bridging and switching, a channel number of protected working channel, and utilization condition of protection channels of M:N protection switching of the ring network may further include:

at a network node which initiates the switch request, determining a protection channel which may be occupied by this protection switching, the information of flag of long or short path of the protection channel, the status of bridging and switching, based on the utilization condition of protection channels saved locally at the node.

The above process of determining at a network node which initiates the switch request may further include:

In the case that all the protection channels on the network node are used, determining a protection channel which may be occupied based on the priority of the switch request and the priority of the corresponding switch request of each used protection channel.

The process of carrying the information in a signaling and transferring it on the ring network may further include:

transferring the signaling through a protection channel in the ring network or a private control channel in the ring network; in the case the signaling is transmitted by a private control channel, the channel number of the protection channel initiating the switch request is carried in the signaling.

The process of carrying the information in a signaling and transferring it on the ring network may further include:

at the network node which initiates the switch request, transmitting the signaling through the protection channel or the private control channel, in the short path direction and the long path direction of the ring network respectively, to the other end network node of the span of this switch request.

The process of performing the M:N protection switching of the ring network by a ring network node according to the information in the signaling may include:

upon receipt of the switch request, updating the information of the utilization condition of protection channels saved locally by a network node of the ring network based on the content carried by the signaling of the switch request, and determining whether the corresponding protection channel is allowed to be used based on the condition of a local switch request, and if yes, transferring the switch request to the destination end of the span corresponding to the switch request, otherwise, terminating the switch request.

In an embodiment of the present invention, in the case that the signaling is transmitted through a private control channel, the process of performing the M:N protection switching of the ring network by a ring network node according to the information in the signaling further includes:

C1, receiving a PDU message of the APS protocol signaling, and judging whether an error occurs according to the check code, and if yes, discarding the message, otherwise, executing step C2;

C2, inquiring the protocol version number of the APS protocol signaling, and judging whether it matches with the local protocol version number, and if yes, executing step C3 otherwise, reporting an alarm message;

C3, judging whether a PDU message is lost based on the serial number of the PDU message, and if yes, discarding the PDU message, otherwise, performing a protection switching based on the switch request.

It can be seen from the above technical solution that, a format of APS protocol, signaling is provided, which contains a variety of information necessary for the implementation of the protection switching. The format of signaling carried by the overhead bytes and the format of signaling carded by the PDU messages are also provided. Thus, the signaling may be transmitted on a protection channel or on a private control channel. A reasonable and effective method for transmitting APS protocol signaling for M:N protection switching of the ring network is also presented, so that the corresponding protection switching is enabled successfully, and the reliability of the ring network may be improved.

BRIEF DESCRIPTIONS OF THE DRAWINGS

DETAILED DESCRIPTIONS OF THE EMBODIMENTS

An embodiment of the present invention provides a method for realizing the M:N protection switching in M:N protection ring network, in which the format of signaling necessary for the protection switching operation and the mode of signaling transmission in the ring network are defined, so as to ensure the reliability of the M:N protection switching operation in the ring network.

In the method according to an embodiment of the present invention, the signaling based on APS (Automatic Protection Switching) protocol is adopted to bear the information necessary for protection switching operation, and the APS protocol signaling is transmitted through a protection channel or a private control channel.

The formats and transmission methods of signaling, when the signaling is transmitted via a protection channel or a private control channel, are illustrated below respectively.

Figures 1, 2:
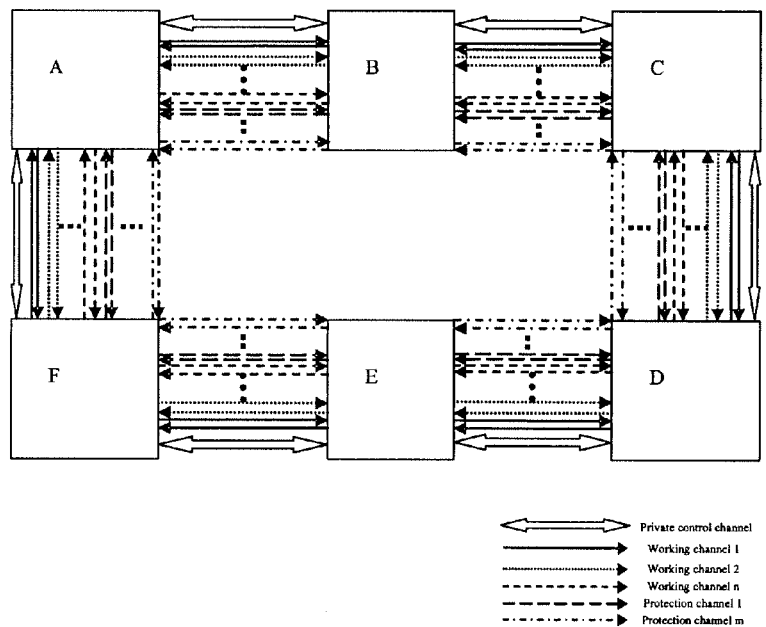
FIG. 1 is a schematic diagram illustrating the format of signaling transmitted by a protection channel according to an embodiment of the present invention.
FIG. 2 is a schematic diagram illustrating a private control channel for M:N protection of ring network according to an embodiment of the present invention.

First, when the signaling of the protection switching operation is transmitted by a protection channel, the information fields to be contained in the signaling may include: a switch request field, a field of destination node number of the switch request, a field of source node number of the switch request, a field of long or short path flag, a field of bridging and switching status, a field of channel number of the protected working channel, and an information field of the utilization condition of the protection channels;

The signaling should have sufficient length in order to transmit more information in the signaling bytes. For example, in the four APS/PCC (Automatic Protection Switching/Protection Control Channel) overhead bytes according to the OTN (Optical Transport Network) standard ITU-T G709, the signaling format of which is as shown in FIG. 1, the switch request, the destination node of the switch request, the source node of the switch request and the channel number of the protected working channel are represented by 5 bits respectively, the flag of long or short path is represented by 1 bit, the status of bridging and switching is represented, by 3 bits, and the information of the utilization condition of the protection channels is represented by 8 bits, as shown in FIG. 1.

The values of all fields in the signaling are the values of protection channels on the span between the destination node and the source node of the switch request. It can be seen from the number of bits of the field of destination node number and the field of source node number of the switch request as shown in FIG. 1 that this format of signaling can support the protection switching of a ring network composed of 32 network nodes.

The switch request is a switch request on the working channel to be protected by the protection channel on the span, and it substantially may be any of all the switch requests defined in SDH/SONET. In addition, the priorities of LP-S (Lockout of Protection Span) and SF-P (Signal Fail Protection) are distinguished, as shown in the following Table 1:

TABLE 1

| Bits | | | | | |
|---|---|---|---|---|---|
| D1 | D2 | D3 | D4 | D5 | Bridge Request code (Bits D1-D5) |
| 1 | 0 | 0 | 0 | 0 | Lockout of Protection (Span) LP-S |
| 0 | 1 | 1 | 1 | 1 | Signal Fail (Protection) |
| 0 | 1 | 1 | 1 | 0 | Forced Switch (Span) FS-S |
| 0 | 1 | 1 | 0 | 1 | Forced Switch (Ring) FS-R |
| 0 | 1 | 1 | 0 | 0 | Signal Fail (Span) SF-S |
| 0 | 1 | 0 | 1 | 1 | Signal Fail (Ring) SF-R |
| 0 | 1 | 0 | 1 | 0 | Signal Degrade (Protection) SD-P |
| 0 | 1 | 0 | 0 | 1 | Signal Degrade (Span) SD-S |
| 0 | 1 | 0 | 0 | 0 | Signal Degrade (Ring) SD-R |
| 0 | 0 | 1 | 1 | 1 | Manual Switch (Span) MS-S |
| 0 | 0 | 1 | 1 | 0 | Manual Switch (Ring) MS-R |
| 0 | 0 | 1 | 0 | 1 | Wait-To-Restore WTR |
| 0 | 0 | 1 | 0 | 0 | Exerciser (Span) EXER-S |
| 0 | 0 | 0 | 1 | 1 | Exerciser (Ring) EXER-R |
| 0 | 0 | 0 | 1 | 0 | Reverse Request (Span) RR-S |
| 0 | 0 | 0 | 0 | 1 | Reverse Request (Ring) RR-R |
| 0 | 0 | 0 | 0 | 0 | No Request NR |
| Others | | | | | Reserved for future use |

The field of long or short path flag is used to indicate whether the switch request uses a long or short path, the long path is represented by value 1, and the short path is represented by value 0.

The status of bridging and switching refers to the states of two end nodes on the protection channel of this span, and the value of this status held is as shown in Table 2.

TABLE 2

| | | | Status |
|---|---|---|---|
| Bit | | | |
| 6 | 7 | 8 | |
| 1 | 1 | 1 | AIS (Alarm Indication Signal) |
| 1 | 1 | 0 | RDI (Remote Defect Indication) |
| 1 | 0 | 1 | Reserved for future use |
| 1 | 0 | 0 | Reserved for future use |
| 0 | 1 | 1 | Extra Traffic on protection channels |
| 0 | 1 | 0 | Bridged and Switched (Br&Sw) |
| 0 | 0 | 1 | Bridged (Br) |
| 0 | 0 | 0 | Idle |

The channel number of the protected working channel a the channel number of the working channel protected by this protection channel transmitting this APS protocol signaling on this span. It can be seen from the value scope of the channel number of the protected working channel in FIG. 1, that this type of signaling can support 32 working channels at most.

The information of the utilization condition of protection channels refers to the information of the utilization condition of all protection channels in the span. It can be seen from the information field of the utilization condition of protection channels, that the signaling format shown in FIG. 1 can support 8 protection channels at most. In other words, it can be configured as the 8:32 protection system of ring network at most. As shown in FIG. 1 A-H in the information field of utilization condition of protection channels correspond to the utilization condition information of protection channels 1-8 respectively, where the value 1 of A-H indicates that the corresponding protection channel is occupied, and the value 0 indicates that the corresponding protection channel is idle.

In an embodiment of the present invention, in order to improve the reliability of the protection switching operation, the corresponding overhead field can be extended on the basis of the content information of the fields included in the signaling shown in FIG. 1, and a verification field of the switch page may be added to verify whether the switch page is correct to avoid the confusion of protocol states. For example, if the opposite end is a switch page of westward ring, the local end must be a switch page of eastward ring.

In an embodiment of the present invention, in order to avoid the loss of overhead bytes during transmission, a serial number field may be added. The network node receiving the signaling can get to know whether the overhead bytes are lost during transmission through the corresponding serial number.

In an embodiment of the present invention, in order to avoid the occurrence of error in the overhead bytes during transmission, a check code field may be added to ensure the accuracy of the received information.

In an embodiment of the present invention, a protocol version number can also be added in the signaling so as to avoid the problem due to the interaction between different versions of the protocol.

With the signaling format shown in FIG. 1, the APS protocol signaling may be transmitted in the ring network when a protection switching operation is needed. The particular transmission procedure is shown as follows:

In the case that a new switch request is presented, if a certain protection channel is determined to be used to protect the failed working channel by comparing the priorities of the switch requests and considering the information of the utilization condition of the protection channels, the switch request overhead byte of short path is sent in the direction of failure over this protection channel, and the switch request overhead byte of long path is sent in the receiving direction over this protection channel, wherein the overhead bytes are filled according to the definition and the practical condition of the span.

Figures 3, 4:
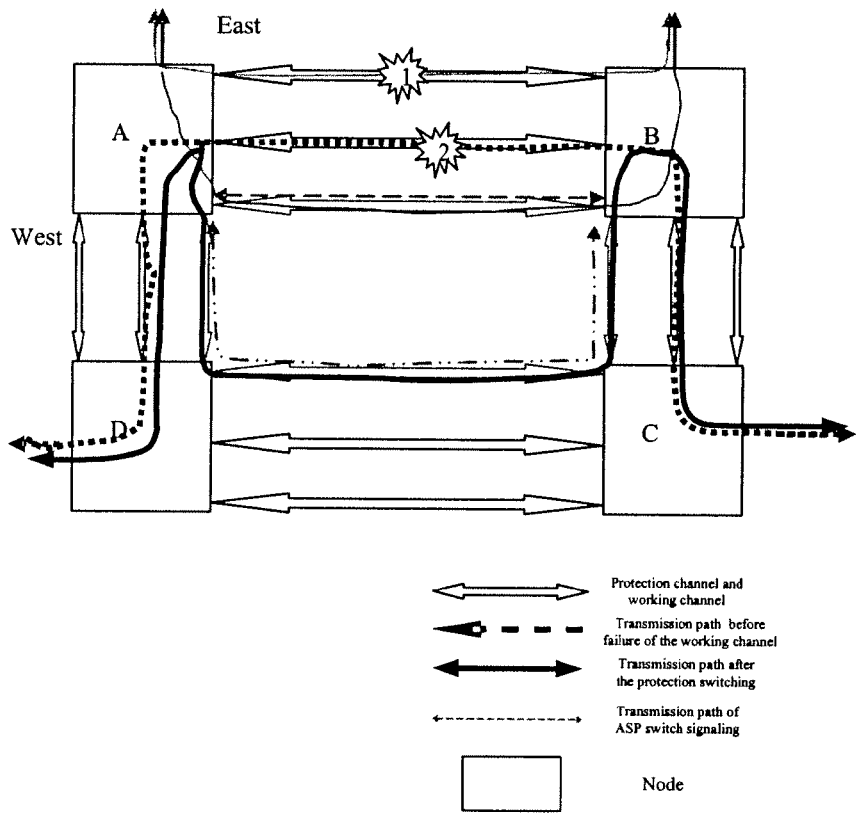
FIG. 3 is a schematic diagram illustrating the format of signaling transmitted by a private control channel according to the embodiment of the present invention.
FIG. 4 is a schematic diagram illustrating the signaling transmitted by a protection channel according to an embodiment of the present invention.

Upon receipt of these two overhears bytes, each network node on the ring first updates the utilization condition table of protection channel saved in the local network element, for example, the recorded utilization condition table of protection channel shown in FIG. 3.

Then it is decided, based on the condition of the local switch request and the specification of the APS protocol, whether the protection switching is allowed to use the protection channel, and if yes, the intermediate nodes are allowed to enter the pass-through status (partially pass-through, full pass-through). Otherwise, the overhead byte is terminated and a new overhead byte is sent according to the local condition. The two end nodes of the failed span decide the bridging and switching action of the protection channel based on the received signaling transmitted over the protection channel.

A network node may receive the signaling from different protection channels which should be treated respectively by the protocol processor of this network node, so as to enable m protection channels to protect the traffic on working channels with a relatively independent manner.

The APS protocol signaling can also be transmitted through the private control channel. As shown in FIG. 2, the channels illustrated by the outermost bold double-arrow-headed lines in the ring network represent the private control channels. In the case that the signaling of the protection switching operation is transmitted through a private control channel, the information content necessary to be carried by the signaling is substantially the same as that carried by the signaling transmitted through a protection channel mentioned above. In other words, the switch request, the destination node number field of the switch request, the source node number field of the switch request, the flag of long or short path, the status of bridging and switching, the channel number of the protected working channel and the information of the utilization condition of the protection channels are still necessary to be carried in this signaling, and the difference lies in that the channel number of the protection, channel initiating the request is necessary to be carried in this signaling. The detailed format of this signaling is shown in FIG. 3.

The signaling is carried and transmitted with a PDU message, in which the information carried by each field includes:

version number: which is utilized to realize the interaction between different protocol versions, and avoid the problem due to the interaction between incompatible protocol versions;

channel number of the protection channel initiating the request: which illustrates that the span between the destination node of the switch request and the source node of the switch request is to be protected by this protection channel. Therefore, the network element which received this PDU signaling message needs to decide, based on the channel number, whether the local protection channel is used to protect the request with higher priority, and if yes, the transmission of this message is terminated. If the local protection channel is idle (in transmission of extra traffics) or is protecting a switch request with a lower priority, the local switch request is suppressed by the request in the received PDU signaling message, the local protection channel is set to the pass-through status, and the PDU message (that is, PDU signaling) is transmitted to the next network node, that is, is transmitted in the reverse direction in which the message is received;

Msgid (PDU message identification): which is used to transmit various messages and realize various functions, for example, the information carried in the Msgid during the verification of the protocol switch page is PDU-ID-SWPG-VERIFY, the information carried by Msgid when the message is used to transmit APS protocol is PDU-ID-SWPG-PROTOCOL, so as to extend the functions of the PDU message;

serial number of the PDU message: which is utilized to avoid the loss of PDU message or the phenomenon that a later transmitted message arrived ahead of the previous message. This is a measure for improving the reliability of switch;

destination node number: i.e., the node number of the other end of the span which the node initiating the switch request wishes to protect, which is a field required by the APS protocol;

switching status: which is similar as that in the above described overhead bytes, is used to identify the status of bridging and switching, and is also used to transmit the information of AIS and RDI. This is also a field required by the APS protocol;

source node number: i.e., the number of the node initiating the switch request, which is a field required by the APS protocol;

long or short path flag: which is used to distinguish the APS switch signaling of long or short path. This is a field required by the APS protocol;

switch request: which is used to identify the type of switch request. This field is similar to that defined in the signaling transmitted by overhead bytes and is a field required by the APS protocol;

switch page verification: which is used when the protocol performs a self-restoration in the case that a switch error affects the traffic;

1-16: which are used to identify the information of the utilization condition of 16 protection channels. The value is used bit by bit, wherein the value 0 indicates that the channel is unused, the value 1 indicates that the channel is being used: the protection channel of the failed span in the span switching status is used, or the protection channel of long path of the failed span in the ring switching status is used;

channel number of the protected working channel: the value ranges from 0 to 255, which represents the channel number of the working channel to be protected by the protection channel initiating the switch request;

BIP8 check code: which is used to avoid the occurrence of error daring transmission, and has an affect on the robustness of the switching.

In view of the APS protocol signaling mentioned above, during the transmission in the ring network in which the private control channels are employed, it is necessary for the private control channels to reach every nodes on the ring network, to cater for the requirements of point to point communication and to send signaling in an specified direction, and so on; the particular mode of signaling transmission is shown as follows:

First, it is checked whether there is an error in the signaling transmission based on the byte of check code in the received signaling, if yes, the signaling is dropped, and if not, it is checked continuously whether the protocol version number is matched, if it is not matched, an alarm is reported, and if it is matched, the PDU message is processed diversely based an the Msgid field.

The present invention concerns the processing of signaling PDU message, that is, the processing of PDU-ID-APS-PROTOCOL message. The verification field of the switch page is of no effect on this message, but has effect on the processing of PDU-ID-SWPG-PROTOCOL message. As for the serial numbers of PDU messages used to avoid the message loss, one serial number should be maintained for each protection channel in each span; the serial numbers are not compared with each other. Comparison is made only between the serial numbers in the same span to avoid the message loss. As for the channel number of the protection channel initiating the request, the channel number of the protected working channel and the information field of the utilization condition of the protection channels both are used to contest for resources for channel switch. Upon the receipt of the PDU message, the utilization condition table of the local protection channel should be updated based on the information, as shown in Table 3. The other fields in PDU are the fields required by the APS protocol, so it is necessary to process these fields according to the APS protocol while referring to the utilization condition of the protection channels.

In the present invention, when the corresponding network node decides to perform the protection switching, it is necessary to determine a corresponding channel for this switch request, therefore the resource preemption of protection channel might be needed, and the procedure is described below. As shown in Table 3, the particular procedure of resource preemption of protection channel is as following:

TABLE 3

| protection channel number | span name | | | | | |
|---|---|---|---|---|---|---|
| | A-B | B-C | C-D | D-E | E-F | F-A |
| 1 | 0 | 0 | 0 | 0 | 0 | 0 |
| 2 | 0 | 1 | 1 | 1 | 1 | 1 |
| 3 | 0 | 8 | 0 | 0 | 0 | 0 |
| 4 | 0 | 0 | 0 | 0 | 0 | 0 |

Table 3 is the utilization condition table of protection channels in the spans, which is saved by one network node, where the ring network, with 6 network nodes and 4 protection channels is taken, as an Example.

The value 0 in Table 3 indicates that a protection channel of a span is transmitting extra traffic instead of the traffic on the working channel. In the case that a working channel is being protected, the value is the channel number of the working channel.

If the channel number of the protected working channel is not transmitted in the signaling, for example, in the case that the signaling is transmitted by the overhead bytes, the channel number can not be transmitted due to the limitation of the overhead bytes. In this case, in Table 3, it is possible to identify only whether the protection channel is used, if not, the value is 0, and if yes, the value is 1.

It can be seen from the values shown in Table 3, that the No. 3 protection channel in the span BC is protecting the traffic on No. 8 working channel, and the protection channels of other spans are transmitting extra traffic; the No. 1 working channel on the span AB is being protected by the No. 2 protection channel on the spans BC, CD, DE, EF and FA.

The utilization condition of the protection channels on the whole ring may be obtained from the utilization condition table of protection channels. Accordingly, when a new switch request is presented, the APS protocol processor running in the network nodes will look up the table, and perform the protection switching according to the corresponding rules (i.e., the rules of resource occupancy and preemption), and create the corresponding APS signaling for control of the protection switching operation. The corresponding rules might be:

1. first, a certain protection channel of the current network node may be used for protection if this protection channel is in the status of partial pass-through;

When the protection channel of a certain span on the ring is used for span switch, the state of this protection channel is the partial pass-through state on the other network elements. The utilization ratio of the protection channels may be improved if the protection channels in the partial pass-through state are utilized preferentially, since one protection channel can be used simultaneously for span switch on different spans of the ring;

2. In the case that there is no protection channel in the partial pass-through state, the unused protection channel(s) of the current span (that is the protection channel in the idle state) will be used for span protection;

3. In the case that there is no protection channel in the partial pass-through state or in the idle state, that is, all of the protection channels of the current span are being used to protect the traffic on the working channel, the protection channel(s) in span protection will be searched, and the long path protection channel(s) of these protection channels will be used;

There may be several protection channels as such, in this case, it is necessary to choose among these protection channels. The rules for choosing are: in the case that there is coexistence of span switches in these protection channels, the span switch requests of long paths which are not directed to the current node can be received in the reverse direction of these protection channels. In the case that there is a request among these span switch requests whose priority is lower than that of the new local switch request, the long paths of these protection channels will be used, and if there are more than one protection channels as such, the long path of the protection channel with the lowest priority is preempted.

4. If an available protection channel can not be determined with the approaches described in the above 1, 2, and 3, the local protection channel may be used for long path protection in other spans, that is, the channel of the local node is in the state of full pass-through, and a ring switch request of long path which is not directed to the local node is certainly received in these protection channels. In the case that the priority of a request among these span switch requests is lower than the priority of the local request, the channel of this request is preempted, so that this protection channel is used for the local span protection, the other nodes of the protection channel are all in the state of partial pass-through, the bridging and switching of ring switch, which are established originally in other spans, are to be released.

5. If all of the local protection channels are used for span or ring switch protection, and all of the long paths of these protection channels are used in the span protection with higher priority in other spans, the local switch request can not establish any bridging and switching, so that the traffic of the working channel, on which this switch request is initiated, can not be protected.

For the local SF, SD requests, if the local protection channels of short path can be used for protection, the SF-S, SD-S switch requests may be sent; if the local protection channels of long path can be used for protection, the SF-R, SD-R switch requests may be sent.

The embodiments of the M:N protection of ring network according to the present invention will be described below.

In one embodiment, the signaling is transmitted by the overhead bytes, as shown in FIG. 4 which illustrates a 1:2 ring system including 4 network elements. Two failures of working channels occur between the nodes A and B. For the first failure, a span switch may be used for protection, and the way of processing is same as that of the 1:1 ring protection switching. When the failure of the No. 1 working channel has been protected successfully, a new failure occurs in the No. 2 working channel. Since the protection channel between A and B has already been used, the node A (on the assumption that A is the node initiating the switch, and B is the response node of the switch) tries to use the long path of the No. 1 protection channel of the span AB, i.e., No. 1 protection channel in the spans BC, CD and DA, for ring protection. Thus, the node A sends an SF-R switch request of long path in the westward direction, and transmits the channel number 2 of the protected working channel and the utilization condition of the protection channels, i.e., the protection channel is being used.

Upon receipt of the SF-R switch request, the node D updates the utilization condition table of the local protection channel. The protection channel 1 can be used since it is in the state of partial pass-through. The state of the protection channel 1 changes from the partial pass-through state to the full pass-through state, and the signaling passes through. The processing in the node C is similar to that in the node D. The node A receives the switch request signaling of long path sent from B, and performs a bridging and switching. The node A is also required to send a signaling indicating that the long path SF-R is bridged. Since the node A performs a bridging and switching upon receipt of the switch request signaling of long path, the traffic on the working channel is protected. As shown in FIG. 4, the failure of the working channel may result in the loss of the service transmitted through the path illustrated by the bold dashed line, and after the process of the protection switching, the traffic can be transmitted, through the path illustrated by the bold solid line, thereby the traffic is protected.

In the above described embodiment, the transmission of signaling is illustrated by the thin dashed line in FIG. 4.

Figure 5:
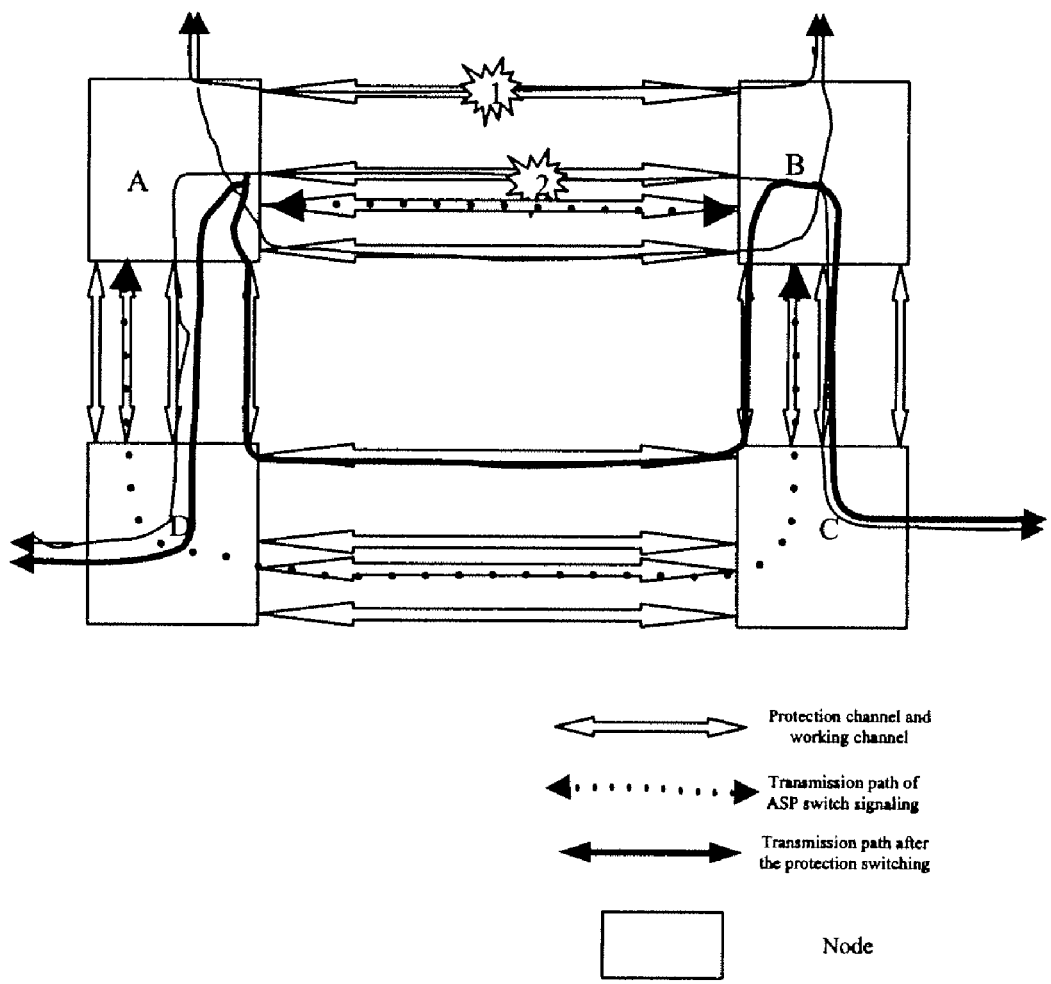
FIG. 5 is a schematic diagram illustrating the signaling transmitted by a private control channel according to an embodiment of the present invention.

In another embodiment, the signaling is transmitted by the private control channel. As shown in FIG. 5, the bold solid line in this figure represents a private control channel by which all APS signaling of the protection channel are transmitted, and the dashed arrow-headed line represents the transmission path of ASP switch signaling.

Now the particular processing procedure will be described below: the process following the receipt of the APS protocol signaling by each network element is substantially the same as in the case that a protection channel is utilized in transmission of the signaling. But, all the nodes between the node initiating the switch request and the node responding to the switch request, are required to process the fields of protection channel number in the received signaling respectively, that is, different protection channel numbers are handled differently, so as to ensure the working channels to be protected by the protection channels with a relatively independent manner. In addition, it is also necessary to process the serial numbers of the signaling in order to avoid the out-of-sequence of signaling resulting from the fact that a same control path is used.

Figure 6:
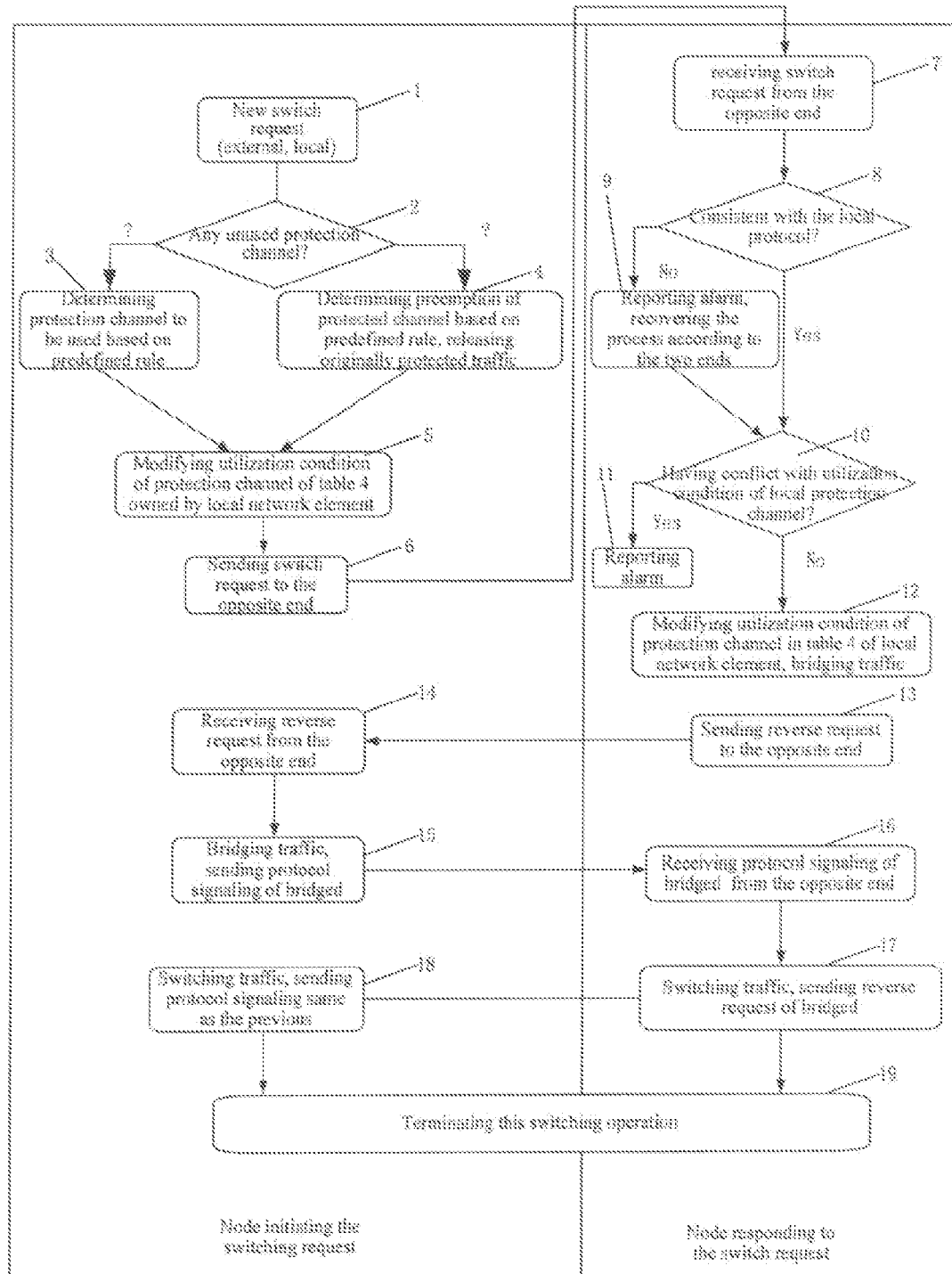
FIG. 6 is a flow diagram of an embodiment of the present invention of realizing M:N protection switching operation of ring network based on the channel number of a protected working channel and the information of utilization condition of the protection channels.

The particular M:N protection switching operation of ring network is based on the channel numbers of the working channels and the utilization condition of the protection channels. Refer to FIG. 6. Table 4 is the internal, recording table of each network node executing the flow of the embodiment shown in FIG. 6. It illustrates the utilization condition of each protection channel, such as, which working channel is protected by the protection channel, and which type is the switch request of the working channel.

TABLE 4

| Protection channel number | Protected working channel number | Type of request |
| --- | --- | --- |
| 1 | 5 | FS |
| 2 | 8 | MS |
| 3 | Default Value | Default Value |
| ... | ... | ... |
| M | Default Value | Default Value |

The flow shown in FIG. 6 relates to two nodes, wherein the flow in the left side of FIG. 6 relates to the node initiating the switch and the flow in the right side of FIG. 6 relates to the node responding to the switch. According to FIG. 6 the network node A creates a new switch request in step 1 (for example, a working channel 5), the network node, which detects the request and is required to perform switch operation, looks up the Table 4 maintained by itself to check whether there is any protection channel which is unused. If there is, the node determines the protection channel to be used according to a predefined rule, for example, the unused protection channel with the smallest number, such as a protection channel of number 3. If there is no protection channel that is unused, the node determines the protection channel to be preempted according to the rule, and releases the traffic which is protected by this channel, so as to take this channel as the protection channel to be used. Then in step 5, the utilization condition of the protection channels in Table 4 saved by the local node is modified, and in step 6, the protocol signaling is sent over the No. 3 protection channel.

In step 7, the network node B of the corresponding switch detects the new protocol signaling, transmitted from the No. 3 protection channel, and transfers it to the protocol processor embedded in the node. In step 8, the protocol processor judges firstly whether the type of the received protocol signaling is consistent with the type of the protocol in the node, if not, the processor reports an alarm and processes it according to the default signaling type, then step 10 is executed. If it is consistent, it is directly judged in step 10 whether there is a conflict between the selected protection channel and the protection channel used by the local node, and if yes, an alarm is reported and the process of protection switching is terminated. If there is no conflict, the utilization condition of the protection channels in Table 4 of the local node is modified and the traffic is bridged, that is, the traffic of the working channel 5 is bridged to the protection channel 3. Then in step 13, a protocol signaling, which type is a reverse request, is sent to the node initiating the switch through the No. 3 protection channel.

In step 9, the operation of reporting an alarm by node B may be implemented in the following steps; first, the content of Table 4 saved in the local node is checked. If the protection channel whose number is less than 3 has not been used for protection, an alarm is reported. If the protection channel of number 3 has already been used to protect other working channels, another alarm is reported. If it is not in the above mentioned situations, Table 4 of the local node is updated, then the value of the protected working channel number corresponding to the protection channel 3 is changed into 5, and the request field of the signaling to be sent is updated by the network node B to the content of the switch request field of the received signaling mentioned above.

In step 14, the network node A receives the protocol signaling of the reverse request and updates the content of Table 4 in the local node, and changes the value of the protected working channel number corresponding to the protection channel 3 into 5, and the request is changed into that of the working channel 5. Then in step 15, the traffics are received, selectively from the protection channel 3, the traffic of the working channel 5 is bridged to the protection channel 3. Then the protocol signaling is sent over the protection channel 3.

In step 16, the network node B receives the protocol signaling sent from the network node A through the protection channel 3, receive traffics selectively from the protection channel 3. In step 17, a protocol signaling is sent to the network node A. In step 18, the network node A receives the protocol signaling and the protection procedure is terminated.

In practice, in order to avoid the switch jitter, it is necessary to set a timer (each switch has a timer) after the local switch is cleared. The action of releasing switching and bridging is not performed until the timer expires, so that the traffic is restored to the working channel actually. The WTR (WAIT TO RESTORE) protocol signaling is sent before the timer expires, at this time, if a new switch request is created, the switch request of this channel takes part in the preemption of the protection channels according to WTR.

After a protection channel delivers an external lockout of protection and the local side detects the failure of the protection channel, it is detected whether there is any unused protection channel. If yes, the traffic of the current protection channel is bridged to an unused protection channel with the minimum channel number. If all the protection channel are in use, the switch request of the working channel which is protected by the protection channel is treated as a new switch request, which is processed according to the following steps; In the case that not all of the protection channels are in use, there will be no preemption of the protection channels. If all of the protection channels are used and a new switch request is created, the table 4 will be looked up, and the switch request of a working channel, which has the lowest priority, is found and released. The released protection channel is employed to protect the traffic of the working channel initiating the new request. If all the switch requests of the working channels are the same, the protection channel with the minimum number has the highest priority.

The type of the supported protocol may be single-ended or dual-ended, and may be restorable or un-restorable. However, in order to utilize a protection channel to transmit extra traffic effectively, the default type is dual-ended and restorable. For the two network nodes at two ends, if the types of the protocols are different, the process will be performed according to dual-ended and restorable protocol.

While the preferred embodiments of the present invention have been described above, it shall be noted that the scope of the present invention is not limited to these. Those skilled in the art shall readily recognize various variations and alterations within the scope disclosed by the present invention, and these variations and alterations are to be encompassed within the protection scope of the present invention. Therefore, the protection scope of the present invention should be defined by the claims.

What is claimed is:

1. A method for realizing many to many protection switching of ring network, comprising:
   determining, by a source node of a switch request, information about a type of the switch request, a destination node of the switch request, a flag of long or short path, a status of bridging and switching, a channel number of protected working channel, and utilization condition of protection channels of M:N protection switching of the ring network;
   wherein one of the protection channels that is available to be used by the protection switching, the information of flag of long or
   short path of the protection channel, and the status of bridging and switching are determined based on the utilization condition of protection channels in a utilization condition table saved locally at the source node, and wherein the utilization condition table comprising the utilization condition of protection channels in each span of the ring network is saved by each of network nodes in the ring network;
   carrying the information and information about the source node of the switch request in a signaling and transferring the signaling on the ring network; wherein the signaling is based on the Automatic Protection switching (APS) protocol signaling, and is carried and transmitted by overhead bytes or a Protocol Data Unit(PDU) message; wherein the signaling is transferred through a protection channel in the ring network or a private control channel in the ring network; in the case the signaling is transmitted by a private control channel, the channel number of the protection channel initiating the switch request is carried in the signaling;
   upon receipt of the signaling, performing the M:N protection switching of the ring network by a ring network node according to the information in the signaling; and upon receipt of the switch request, updating the utilization condition of protection channels in the utilization condition table saved locally by a network node of the ring network based on the content carried by the signaling of the switch request, and determining whether the corresponding protection channel is allowed to be used based on the condition of a local switch request, and if yes, transferring the switch request to the destination end of the span corresponding to the switch request, otherwise, terminating the switch request.

2. The method according to claim 1, wherein the information carried in the signaling further comprises:
   information of switch page verification, serial number, check code or protocol version number.

3. The method according to claim 1, wherein the information of the switch request comprises:
   at least one of information about span protection lockout request or signal failure protection request.

4. The method according to claim 1, wherein the utilization condition of protection channels comprises at least one of
   whether a protection channel is in a status of partial pass-through, whether the protection channel is in an idle status, the protection channel being applied to span protection, the protection channel being applied to ring protection, or the priority of the corresponding switch request when the protection channel is applied.

5. The method according to claim 1, wherein the status of bridging and switching comprises:
   Alarm Indication Signal (AIS), Remote Defect Indication (RDI), the protection channel being occupied by extra traffic, bridging and switching, bridging, and an idle status.

6. The method according to claim 1, wherein the method further comprises: in the case that all the protection channels on the network node are used, a protection channel which may be occupied is determined based on the priority of the switch request and the priority of the corresponding switch request of each used protection channel.

7. The method according to claim 1, wherein
at the network node which initiates the switch request, the signaling is transferred through the protection channel or the private control channel, in the short path direction and the long path
direction of the ring network respectively.

8. The method according to claim 1, wherein the method further comprises:
   C1. receiving a PDU message of the APS protocol signaling, and judging whether an error occurs according to the check code, and if yes, discarding the message, otherwise, executing step C2;
   C2. inquiring the protocol version number of the APS protocol signaling, and judging whether it matches with the local protocol version number, and if yes, executing step C3, otherwise, reporting an alarm message;
   C3. judging whether a PDU message is lost based on the serial number of the PDU message, and if yes, discarding the PDU message, otherwise, performing a protection switching
based on the switch request.

9. The method according to claim 1, wherein the M:N protection switching of the ring network is performed based on the channel number of the protected working channel and the utilization condition of the protection channels.

10. The method according to claim 1, wherein the method further comprises: at a network node which initiates a switch request, determining a protection channel which may be occupied by this protection switching, the information of flag of long or short path of the protection channel, the status of bridging and switching, based on the utilization condition of protection channels saved locally at the node.

11. The method according to claim 10, wherein the method further comprises:
   in the case that all the protection channels on the network node are used, a protection channel which may be occupied is determined based on the priority of the switch request and the priority of the corresponding switch request of each used protection channel.

* * * * *